(12) United States Patent
Lewis et al.

(10) Patent No.: US 7,493,488 B2
(45) Date of Patent: Feb. 17, 2009

(54) METHOD TO DISABLE ON/OFF CAPACITY IN DEMAND

(75) Inventors: David O. Lewis, Rochester, MN (US); Lynn A. McMahon, Rochester, MN (US); Terry L. Schardt, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 10/625,955

(22) Filed: Jul. 24, 2003

(65) Prior Publication Data
US 2005/0044219 A1 Feb. 24, 2005

(51) Int. Cl.
*H04L 9/00* (2006.01)
*G06F 15/177* (2006.01)
(52) U.S. Cl. ..................... 713/170; 709/229
(58) Field of Classification Search .................. 713/170
See application file for complete search history.

(56) References Cited

U.S. PATENT DOCUMENTS

| 5,745,879 | A | | 4/1998 | Wyman | |
|---|---|---|---|---|---|
| 6,081,892 | A | | 6/2000 | Lomas | |
| 6,125,457 | A | * | 9/2000 | Crisan et al. | 714/36 |
| 6,161,139 | A | * | 12/2000 | Win et al. | 709/225 |
| 6,374,402 | B1 | | 4/2002 | Schmeidler et al. | |
| 6,389,543 | B1 | * | 5/2002 | Dawson et al. | 726/4 |
| 6,463,537 | B1 | * | 10/2002 | Tello | 713/182 |
| 6,578,199 | B1 | | 6/2003 | Tsou et al. | |
| 6,725,379 | B1 | * | 4/2004 | Dailey | 726/35 |
| 6,754,822 | B1 | | 6/2004 | Zhao | |
| 6,912,512 | B2 | | 6/2005 | Miyazaki et al. | |
| 6,975,204 | B1 | * | 12/2005 | Silver | 340/5.31 |
| 6,993,654 | B2 | * | 1/2006 | Seki et al. | 713/172 |
| 7,017,188 | B1 | | 3/2006 | Schmeidler et al. | |
| 7,020,704 | B1 | | 3/2006 | Lipscomb et al. | |
| 7,055,040 | B2 | | 5/2006 | Klemba et al. | |
| 7,146,496 | B2 | * | 12/2006 | Circenis et al. | 713/100 |
| 7,149,311 | B2 | * | 12/2006 | MacKenzie et al. | 380/286 |
| 7,185,086 | B2 | * | 2/2007 | Bodapati et al. | 709/224 |
| 7,231,369 | B2 | | 6/2007 | Hirabayashi | |
| 7,269,160 | B1 | | 9/2007 | Friedman et al. | |

(Continued)

OTHER PUBLICATIONS

U.S. Appl. No. 10/406,652, "Method to Provide On-Demand Resource Access", Birkestrand, et al., filed Apr. 3, 2003.

(Continued)

*Primary Examiner*—Matthew Heneghan
(74) *Attorney, Agent, or Firm*—Patterson & Sheridan, LLP

(57) ABSTRACT

Method, apparatus and article of manufacture for disabling on-demand access to computerized resources on a computerized apparatus. The method comprises receiving a disablement code; validating the disablement code; and disabling an on-demand resource if the validating is successful, thereby rendering the disabled on-demand resource unavailable for use by users of the computerized apparatus, wherein the disabled on-demand resource is a hardware resource of the computerized apparatus. Another embodiment includes receiving a disablement code comprising encrypted data, validating the disablement code, disabling at least one on-demand resource if the validating is successful. The validating includes generating a first key using system information unique to the computerized apparatus; decrypting the encrypted data using a second key to produce decrypted data; encrypting a value to produce an encrypted value; decrypting the encrypted value to produce a decrypted value; and comparing the value to the decrypted value.

17 Claims, 5 Drawing Sheets

U.S. PATENT DOCUMENTS

| | | | |
|---|---|---|---|
| 2002/0095573 A1* | 7/2002 | O'Brien | 713/168 |
| 2002/0149468 A1* | 10/2002 | Carrender et al. | 340/5.61 |
| 2003/0172035 A1* | 9/2003 | Cronce et al. | 705/59 |
| 2003/0217011 A1 | 11/2003 | Peinado et al. | |
| 2003/0226029 A1* | 12/2003 | Porter et al. | 713/200 |
| 2004/0019789 A1* | 1/2004 | Buer | 713/170 |
| 2004/0054908 A1* | 3/2004 | Circenis et al. | 713/176 |
| 2004/0064268 A1 | 4/2004 | Gillenwater et al. | |
| 2004/0148394 A1* | 7/2004 | Circenis et al. | 709/226 |
| 2004/0148511 A1* | 7/2004 | Circenis et al. | 713/187 |
| 2004/0267944 A1* | 12/2004 | Britt, Jr. | 709/229 |

OTHER PUBLICATIONS

U.S. Appl. No. 10/422,663, "Method to Ensure a Unique Machine Serial Number", Agha, et al., filed Apr. 24, 2003.

* cited by examiner

METHOD TO DISABLE ON/OFF CAPACITY IN DEMAND

CROSS-REFERENCE TO RELATED APPLICATIONS

This application is related to co-pending and commonly owned U.S. patent application Ser. No. 10/406,652, entitled "METHOD TO PROVIDE ON-DEMAND RESOURCE ACCESS", and to U.S. patent application Ser. No. 10/422,663, entitled "METHOD TO ENSURE A UNIQUE MACHINE SERIAL NUMBER", both incorporated by reference in their entireties.

BACKGROUND OF THE INVENTION

1. Field of the Invention

The present invention generally relates to data processing and more particularly to the selective enablement and disablement of hardware capacity on a computerized apparatus.

2. Description of the Related Art

The operation of a business is a dynamic undertaking. To increase profit margins, businesses continually seek out means of assessing and controlling costs. For example, one attractive alternative to outright purchases of assets is leasing. Leasing provides flexibility and, in some cases, tax advantages.

However, regardless of whether an asset is purchased or leased, some assets have periods of idleness, or decreased usage. During these periods, the assets are not productive, or not optimally productive, but still have associated costs which the business incurs. A particular asset that suffers from this problem is the computer.

Today's computers are powerful devices having significant capacity for functions such as processing and storage. Unfortunately, the cost of owning and operating computers can be significant for some businesses. In order to be effective, the computerized resources of a business must be sufficient to meet the current needs of the business, as well as projected needs due to growth. In addition, even assuming no growth, the resources must be capable of tolerating the business's inevitable peaks and valleys of day-to-day operations due to increased loads for seasonal, period end, or special promotions.

As a result, businesses are left in the position of having to invest in more computerized resources than are immediately needed in order to accommodate growth and operational peaks and valleys. In the event the growth exceeds the available computerized resources, the business must upgrade its resources, again allowing for projected growth. Thus, at any given time in its growth cycle, a business will have excess computer capacity allowing for growth as well as the peaks and valleys of short-term operations. This excess capacity translates into real cost for the business.

One solution that gives user's more flexibility is on-demand access to computerized resources. Various forms of on-demand resource access are available from International Business Machines, Inc. For example, one form of on-demand access is provided by International Business Machines, Inc. under the name "On/Off Capacity on Demand" (also referred to herein as On/Off CoD) on its line of eServer computers. Computerized resources are made available on demand in response to actual needs, rather than projected needs. In one aspect, the provision of such flexibility provides a cost efficient solution to accommodate peaks and valleys that occur in any business. Increased loads for seasonal, period end, or special promotions, for example, can be responded to quickly and efficiently. A customer pays for the capacity/resources that it needs, when it is needed. As a result, the cost of computerized resources substantially matches the computerized resources actually being used, and does not include a substantial premium for excess capacity not being used. Of course, in practice, providers may attach some form of a premium to the flexibility provided by on demand resource access. However, even with such a premium, many users will realize a savings.

In one embodiment, users are given access to additional capacity on systems by entering an enablement code provided by a provider, such as IBM, Inc. In one implementation, validation of the enablement code is then performed using enablement data stored on a smart chip onboard the systems. If the enablement code is validated, the user may then request the use of some quantity of resources (e.g., some number of processors). The user may be charged a fee for the usage (based on, for example, the quantity of resources used and the length of time the resources are used).

One problem with on-demand resource access is that once the on-demand feature has been enabled on a given system, additional capacity may be activated from the system console by any authorized operator, resulting in additional (and potentially significant) usage charges for the owner of the system. As a result the owner may want to disable the on-demand feature to prevent operators from incurring additional charges. In addition, the manufacturer/provider (e.g., IBM) may wish to disable the feature if the owner of the system has failed to pay for past usage. Disablement of the on-demand feature is also necessary when the system is sold, from one owner to another, until the new owner has a contract in place for its use.

Disablement could be accomplished by replacing the smart chip that stores the enablement data. However, the solution has significant drawbacks, including the delays inherent in ordering a replacement part, the expense of the part and installation, and customer inconvenience due to powering the system down for hardware replacement and subsequent re-booting (also referred to as initial program load or IPL).

Another alternative is to allow disablement via a screen option. However, this approach would allow any authorized user to disable the on-demand feature, either accidentally or maliciously, thereby potentially depriving the owner of vital server capacity in a critical time.

Therefore, there is a need for a method and system for disabling an on-demand feature on a computer system.

SUMMARY OF THE INVENTION

The present invention generally pertains to on-demand access to computerized resources.

One embodiment provides a computer-implemented method for disabling on-demand resources on a computerized apparatus. The method comprises receiving a disablement code; validating the disablement code; and disabling at least one on-demand resource if the validating is successful.

Another embodiment provides a computer-implemented method for disabling on-demand resources on a computerized apparatus. The method comprises receiving a disablement code comprising encrypted data; validating the disablement code and disabling at least one on-demand resource if the validating is successful. In one embodiment, validating comprises generating a first key using system information unique to the computerized apparatus; decrypting the encrypted data using a second key to produce decrypted data; encrypting a value using one of the first key and the decrypted data as an encryption key; and decrypting the value using the other of the first key and the decrypted data as a decryption key.

Another embodiment provides a computer-implemented method for controlling availability of on-demand resources on a computerized apparatus, the method comprising: receiving an enablement code for an on-demand resource; validating the enablement code; enabling the on-demand resource, whereby usage of the on-demand resource may be requested by a user; receiving an disablement code for an on-demand resource; validating the disablement code; and disabling the on-demand resource; whereby usage of the on-demand resource may no longer be requested by the user.

Another embodiment provides a computer-implemented method for generating disablement codes for disabling on-demand resources on a computerized apparatus. The method comprises inputting a plurality of inputs to an authentication code generator, the plurality of inputs comprising machine identification information uniquely identifying the computerized apparatus; outputting an authentication code; encrypting the authentication code; and providing a disablement code to a user of the computerized apparatus, the disablement code comprising the authentication code and being configured to disable an on-demand resource on the computerized apparatus upon being validated.

Yet another embodiment provides a computer readable medium containing a program which, when executed, performs an operation for generating disablement codes for disabling on-demand resources on a computerized apparatus. The operation comprises receiving a plurality of inputs to an authentication code generator, the plurality of inputs comprising machine identification information uniquely identifying the computerized apparatus; outputting an authentication code; encrypting the authentication code; and outputting a disablement code for the computerized apparatus, the disablement code comprising the authentication code and being uniquely configured to disable an on-demand resource on the computerized apparatus upon being validated.

Yet another embodiment provides a computer readable medium containing a program which, when executed, performs an operation for validating a disablement code for disabling on-demand resources on a computerized apparatus. The operation comprises receiving the disablement code comprising encrypted data; and validating the disablement code. The validating comprises generating a first key using system information unique to the computerized apparatus; and sending the encrypted data to a secure storage element containing a second key, wherein the secure storage element is configured to decrypt the encrypted data, to produce decrypted data, using the second key and further configured to either (i) encrypt a value using the decrypted data as an encryption key or (ii) decrypt a value using the decrypted data as an decryption key, the value having been encrypted using the first key. The validating further comprising either (i) receiving the encrypted value from the secure storage element, and decrypting the encrypted value using the first key; or receiving the decrypted value from the secure storage element.

Still another embodiment provides a computerized apparatus, comprising a plurality of resources including hardware and software at least one of which comprises an on-demand resource configured to be requested by a user once enabled; and a capacity manager. The capacity manager is configured to at least: receive an enablement code configured to enable the on-demand resource; enable the on-demand resource; receive a disablement code containing encrypted data; validate the disablement code; and disable the on-demand resource if the validating is successful.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally pertains to on-demand access to computerized resources (also referred to herein as On/Off Capacity on Demand, or On/Off CoD). Computerized resources are made available to users on demand. For example, on-demand resource access may be made available by inputting and validating an enablement code. The on-demand feature may subsequently be disabled by inputting and validating a disablement code.

It should be noted that while aspects of the invention are described in the context of a business, the invention provides advantages to any user, whether involved in a business or not.

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
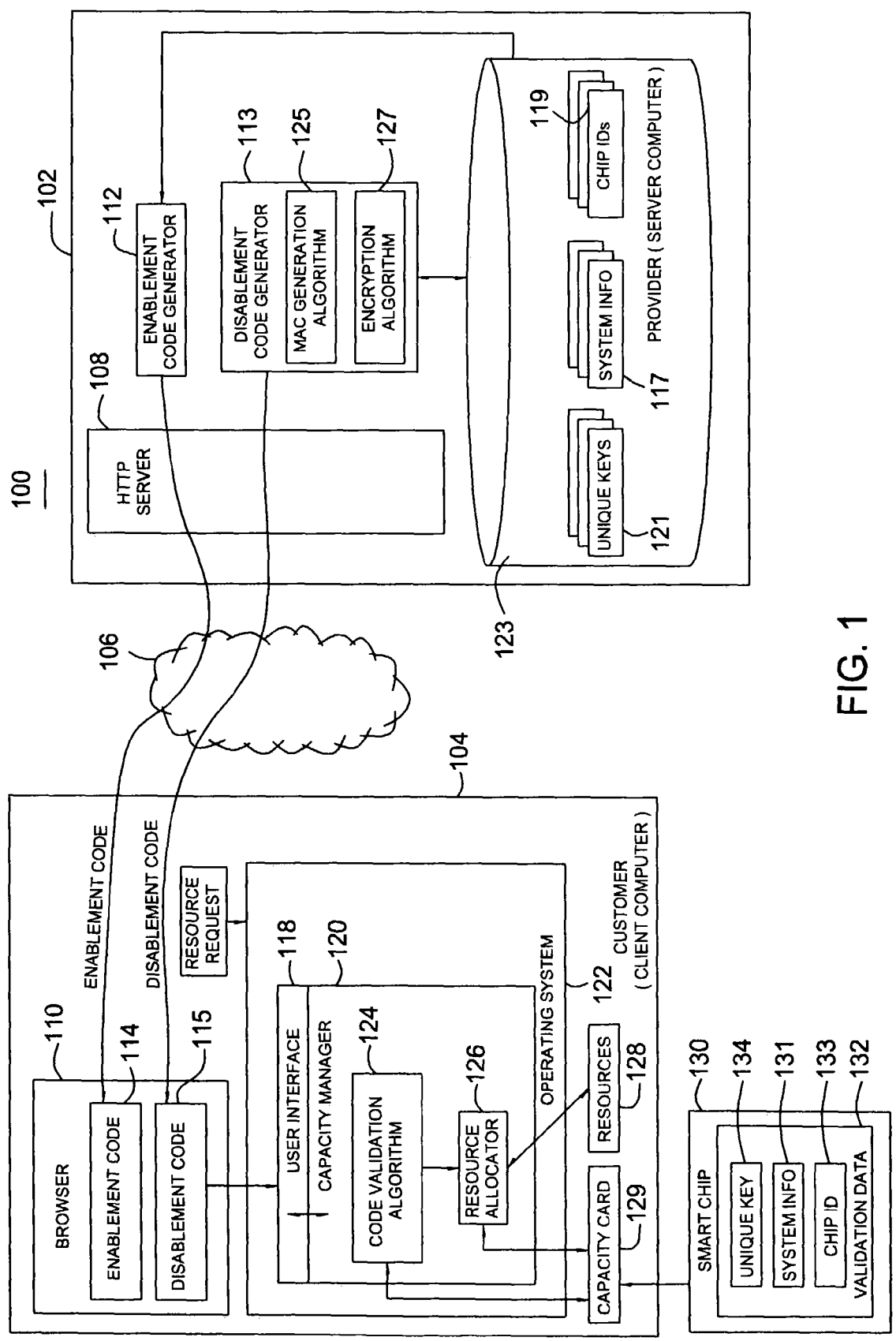
FIG. 1 is a block diagram of an environment having a provider of enablement/disablement codes.

Referring now to FIG. 1, a data processing environment 100 is shown. Generally, the environment includes a provider computer 102 and a customer computer 104. The provider computer 102 is illustratively embodied as a server computer with respect to the customer computer 104, which is therefore embodied as a client computer. Although both are shown as singular entities, in practice the provider computer 102 and the client computer 104 may each be a network of computers configured to perform various functions described herein. Therefore, it is understood that although only one client computer is shown, a plurality of client computers may be configured according to aspects of the invention and, in some cases, be serviced by the provider computer 102 and/or the customer computer 104. Further, the terms "client" and "server" are used merely for convenience and not by way of limitation. As such, the customer computer 104, which may be a client relative to the provider computer 102 in some regards, may itself be a server relative to one or more other clients (not shown).

The provider computer 102 and the customer computer 104 communicate through a network 106. Illustratively, the network 106 may be any medium through which information may be transferred such as, for example, a local area network (LAN) and a wide area network (WAN) or a telephone network. The network 106 is merely representative of one communications medium. Some aspects of the invention may be facilitated by other communication mediums such as, for example, the U.S. Postal Service. Still other aspects may be practiced in the absence of any communication medium between the provider 102 and the customer 104.

In a particular embodiment, the network 106 is the Internet. As such, the provider computer 102 may be configured with a hypertext transfer protocol (HTTP) server 108 capable of servicing requests from a browser program 110 residing on the customer computer 104. The HTTP server 108 and the browser program 110 provide convenient and well-known software components for establishing a network connection (e.g., a TCP/IP connection) via the network 106, and for receiving information from users on the computer systems 102, 104.

In one embodiment, the provider computer 102 is configured with an enablement code generator 112 and a disablement code generator 113. The code generators 112/113, in one embodiment, are algorithms capable of generating enablement codes 114 and disablement codes 115, respectively. The code generators 112/113 may be invoked by a request received from the customer computer 104 via the network 106. In response to a request, the code generators 112/113 generate their respective codes 114/115, which may be transmitted to the customer computer 104 via the same network connection. Alternatively, the codes 114/115 may be sent via a different network connection, e.g., a subsequent network connection or an altogether different network. In a particular embodiment, the codes 114/115 are transmitted electronically to a client electronic mail application (e.g., Lotus Notes® or Microsoft Outlook®; not shown) residing on the customer computer 104. Lotus Notes is a registered trademark of International Business Machines, Inc., and Microsoft Outlook is a registered trademark of Microsoft, Inc. In yet another alternative, the codes 114/115 are provided to the user (e.g., administrator) of the customer computer 104 via paper mail (i.e., the postal service) or facsimile, for example.

Regardless of the particular medium, the codes 114/115 are preferably unique and configured for use only on one particular machine (e.g., the customer computer 104). Uniqueness may be ensured, for example, using system information 131 of the customer computer 104, including a machine type code and serial number. Uniqueness may further be ensured by using a chip identifier (ID) 133 for a chip on board the customer computer 104. One such chip is represented in FIG. 1 as a smart chip 130 on board a capacity card 129. A smart chip is desirable because it provides a convenient, secure and tamper-resistant (i.e., not accessible by the user) and nonvolatile storage facility for data. Accordingly, in one embodiment, the collective data used to ensure uniqueness is stored on the smart chip 130. Details for such embodiments are described in U.S. patent application Ser. No. 10/422,663, entitled "METHOD TO ENSURE A UNIQUE MACHINE SERIAL NUMBER", which is herein incorporated by reference in its entirety. The data stored on the smart chip 130 may then be used to validate the codes 114/115 and are, therefore, referred to herein as validation data 132. In one embodiment, the validation data 132 also contains a unique key 134 used for disablement (and, in one embodiment, also for enablement) of the On/Off Capacity on Demand feature. It is also contemplated that some data used for validation purposes may not be stored on the smart chip 130, but instead be stored elsewhere and used in combination with the validation data on the smart chip 130.

Copies of the system information 117, chip IDs 119 and the unique keys 121 (including the unique key 134 shown resident on the smart chip 130) for each of the plurality of customer computers may be stored in a database 123 accessible by the provider computer 102. It is contemplated that, in one embodiment, the chip IDs 119 and the unique keys 121 are written to respective smart chips during the manufacturing of the systems in which the chips are installed. For security, the unique keys 121 are preferably known only to one entity (e.g., a service provider, which may or may not be the manufacture of the system) and, while capable of being used by the respective smart chips on which they are stored, cannot be read from the smart chips. Generation of the codes 114/115 using the information stored in the database 123 will be described in more detail below.

The codes 114/115 may be input to a capacity manager 120 via a user interface 118 (which may be displayable via the browser 110). Alternatively, the codes 114/115 are input directly by the provider computer 102 via a communication link (e.g., a network or modem connection). In still another embodiment, the codes 114/115 are input to the capacity manager 120 via an application or some other program or routine.

In one embodiment, the capacity manager 120 is at least a component of a Capacity on Demand function provided on machines from International Business Machines, Inc. One such machine is the eServer iSeries® computer. By way of illustration only, the capacity manager 120 and user interface 118 are shown as components of an operating system 122. Examples of the operating system 122 include an IBM OS/400® operating system, an AIX® operating system, a UNIX® operating system, a Microsoft Windows® operating system, and the like. However, the illustrated representation is merely one example of a particular software architecture, and not limiting of the invention. OS/400® and AIX®, are registered trademarks of International Business Machines, Inc., and Microsoft Windows® is a registered trademark of Microsoft, Inc.

In one embodiment, a code validation algorithm 124 is invoked to verify the input codes 114/115. Although a single code validation algorithm is shown, it is contemplated that separate validation algorithms may be employed for the enablement code 114 and disablement code 115. As noted above, the codes 114/115 are preferably specific to a particular machine. Accordingly, the validation algorithm 124 determines whether the code 114/115 is configured for the particular machine for which the capacity manager 120 has responsibility and controls resource access. In this regard, it is contemplated that the capacity manager 120 may have resource access responsibility for a plurality of computers (i.e., a network). More typically, however, the capacity manager 120 manages only the resources of the machine on which it resides. In this case, the validation algorithm 124 determines whether the codes 114/115 are configured for the particular machine on which the capacity manager 120 resides.

In one embodiment, the validation algorithm 124 accesses the validation data 132 stored in the smart chip 130 disposed on the capacity card 129. Embodiments of the validation process are described below.

If an enablement code 114 is validated, the capacity manager 120 then enables selected resources 128, e.g., according to data contained in the enablement code 114. In particular, a resource allocator 126 (a function of the capacity manager 120) is invoked to enable, or "unlock", the selected resources. Enabling the resources 128 may be implemented by the provision of capacity-on-demand control hardware, illustratively in the form of the capacity-on-demand cards 129. Each card 129 may be specific to a particular on-demand resource, e.g., processors, memory, etc. Alternatively, a single card may be used to enable multiple resource types. In one aspect, the capacity-on-demand card 129 also includes at least one smart chip 130 used to store capacity-on-demand information in a secure (i.e., not accessible by the user) and nonvolatile manner. In one embodiment, the information stored in the capacity-on-demand cards 129 includes resource usage information and billing information (not shown). As such, the card 129 provides a master copy of such information that may be used to recover from a power failure situation or other catastrophic failure.

In one embodiment, "enabling" or "unlocking" resources by the resource allocator 126 operates to place the resources into service (i.e., to perform their designated functions such as processing or storing, depending upon the resource). In another embodiment, enabling the resources does not place the resources into service, but merely makes the resources available for request by a user. That is, enabling the resources unlocks the resources so that a user can assign them to a task, but does not automatically give control of the resources to the operating system(s) on the computer.

At any time after being enabled, resources may be disabled by inputting and verifying a disablement code 115. Embodiments of the verification process are described in more detail below.

Generally, the resources enabled according to the enablement code 114 and disabled according to the disablement code 115 may be any variety of resources in a computerized apparatus. Such computerized apparatuses include any type of computer, computer system or other programmable electronic device, including a client computer, a server computer, a portable computer, a personal digital assistant (PDA), an embedded controller, a PC-based server, a minicomputer, a midrange computer, a mainframe computer, and other computers adapted to support the methods, apparatus, and article of manufacture of the invention. A computer may include any electronic device having at least one processor, and may be a standalone device or part of a network. Suitable resources include, without limitations, memory size, storage size, a number of processing units, processor speed, etc.

Regarding generation of the codes 114/115, it is contemplated that an encrypted message-authentication-code (MAC) may be used. Accordingly, the disablement code generator 113 is configured with a MAC generation algorithm 125 and encryption algorithm 127. In one embodiment, the enablement code generator 112 employs the same algorithms in the generation of enablement codes. Alternatively, the enablement code generator 112 employs different algorithms.

Figure 2:
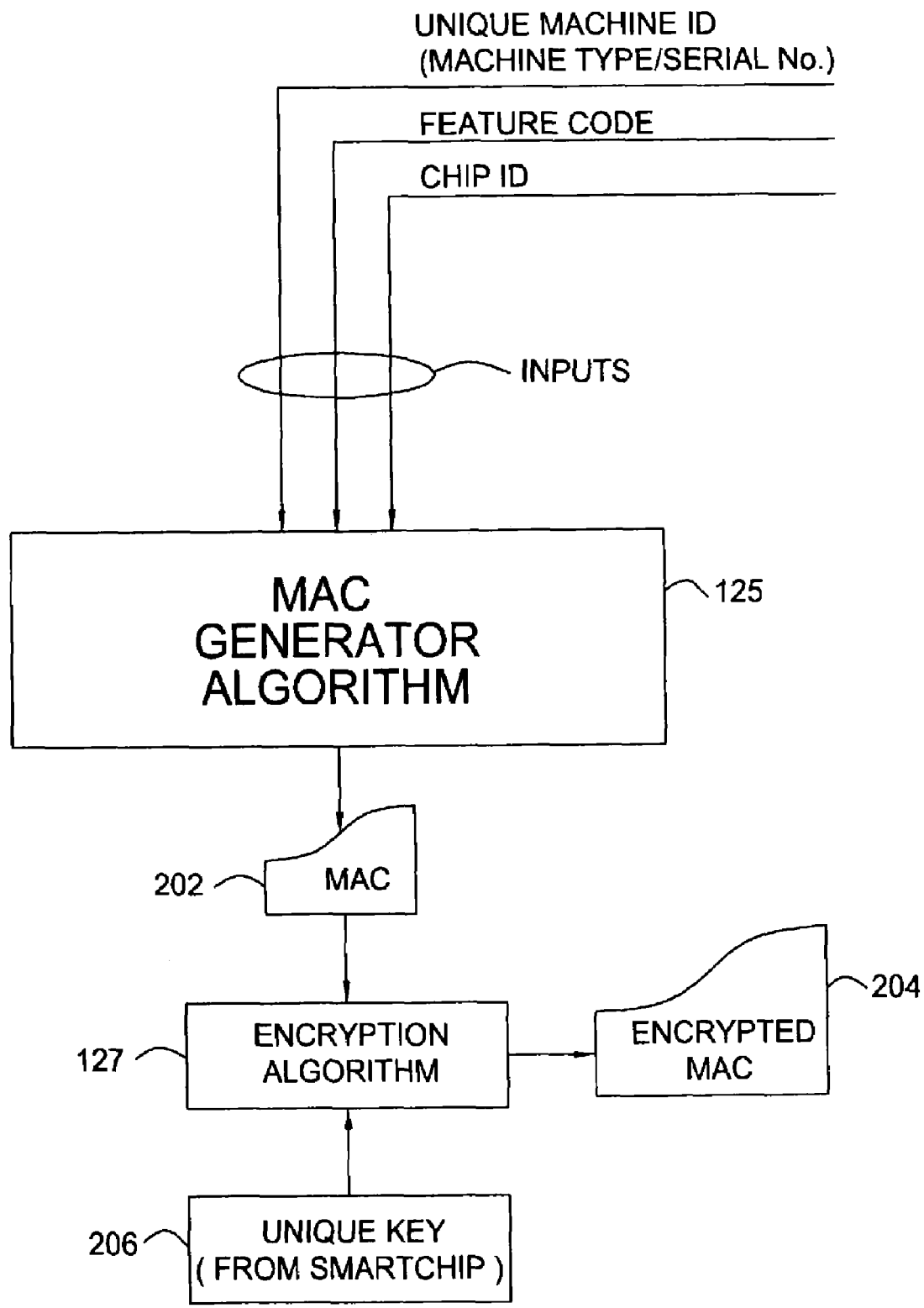
FIG. 2 is a block diagram illustrating one embodiment of generating an encrypted disablement code, or portion of a disablement code.

Referring now to FIG. 2, one embodiment for generating the disablement code 115 is shown. Generally, the MAC generation algorithm 125 takes various inputs to generate the MAC. The inputs preferably include information uniquely identifying a particular system, such as unique machine identification (e.g., machine type and serial number) and a corresponding smart chip ID. To distinguish between the codes in embodiments that have the same MAC generation algorithm 125 for enablement and disablement, the MAC generator algorithm 125 may also take as input a feature code, which is different for disablement codes and enablement codes. In those embodiments, it may also be necessary and/or desirable to include inputs (which may not be otherwise necessary) for purposes of compatibility. For example, in one embodiment, generation of enablement codes includes a current On/Off quantity value, an increment and a sequence number. The increment is the amount of resources being enabled. The current quantity value is the total of all previous increments of all previous enablement codes, and may be set to zero (0) for disablement codes. The sequence number is an increasing value with each issued enablement code and ensures that each subsequent code is, in fact, in sequence (thereby preventing reuse). For disablement codes, these extra inputs may be set to any value.

Other data that may be included with the enablement code 114 (and hence also with the disablement code 115) is described in commonly owned U.S. patent application Ser. No. 10/406,652, entitled "METHOD TO PROVIDE ON-DEMAND RESOURCE ACCESS", herein incorporated by reference in its entirety. However, it is understood that the foregoing illustrative inputs to the MAC generation algorithm 125 are merely illustrative of data that may be included with the enablement and disablement code 114/115. Persons skilled in the art will recognize other embodiments that include more or less data. It is also contemplated that, in one embodiment, an enablement code may not be needed because, for example, systems may be shipped to customers already enabled. As such, the enablement code 114 is being described only for purposes of illustrating one embodiment and is not limiting of the invention.

In any case, the output of the MAC generator algorithm 125 is the message authentication code (MAC) 202. The MAC 202 is then input to the encryption algorithm 127, which outputs an encrypted MAC 204. To encrypt the MAC 202, the encryption algorithm 127 uses a unique key 206 (accessed from the database 123 of unique keys 121, shown in FIG. 1) associated with a smart chip. For example, the unique key 206 may be the unique key 134 stored on the smart chip 130 of the customer computer 104, all shown in FIG. 1.

Although reference is made to creating and encrypting the message authentication code, the particular algorithms and input used to generate encrypted information is not limiting of the invention. Suitable examples of suitable technology that may be used include, without limitations, checksums, Digital Signature Standard (Federal Information Processing Standard 186-2), Elliptic Curve Crypto systems (ECC) and Data Encryption Standard-Message Authentication Code (DES-MAC) and any other technology, known or unknown.

Figure 3:
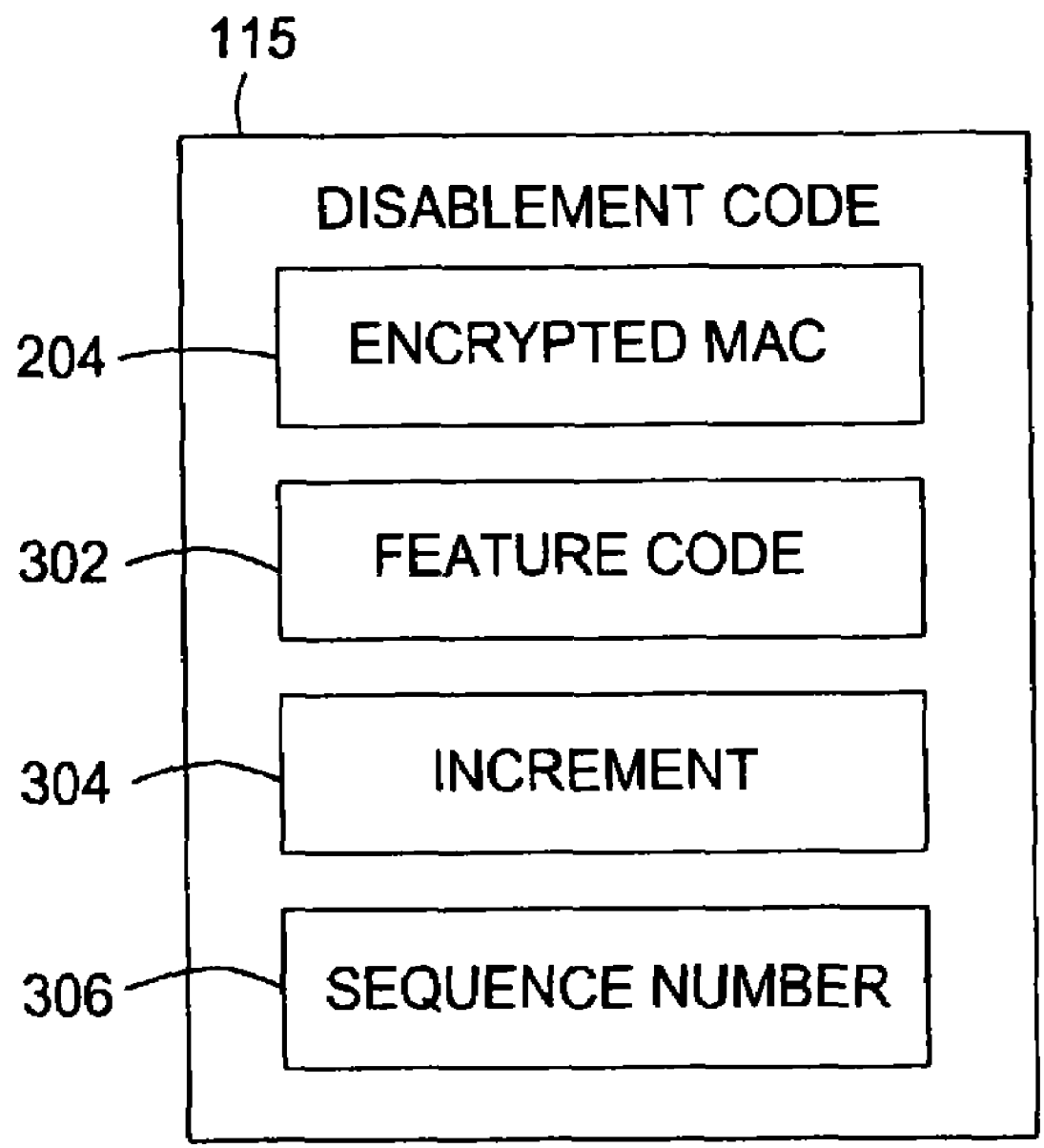
FIG. 3 is a block diagram of one embodiment of a disablement code.

The encrypted MAC 204 may then be used by the disablement code generator 113 to produce a disablement code 115. One embodiment of a disablement code 115 is shown in FIG. 3. Illustratively, the disablement code 115 includes the encrypted MAC 204 and some of the data that may used as inputs to the MAC generation algorithm 125; illustratively, the appropriate feature code 302 (for disablement codes), the increment 304 and the sequence number 306. Again, the feature code 302, the increment 304 and the sequence number 306 may be eliminated in other embodiments, so that the encrypted MAC 204 alone is the disablement code.

In one embodiment, a checksum is calculated over the disablement code 115 to detect errors in subsequent transmission and keying.

Figure 4:
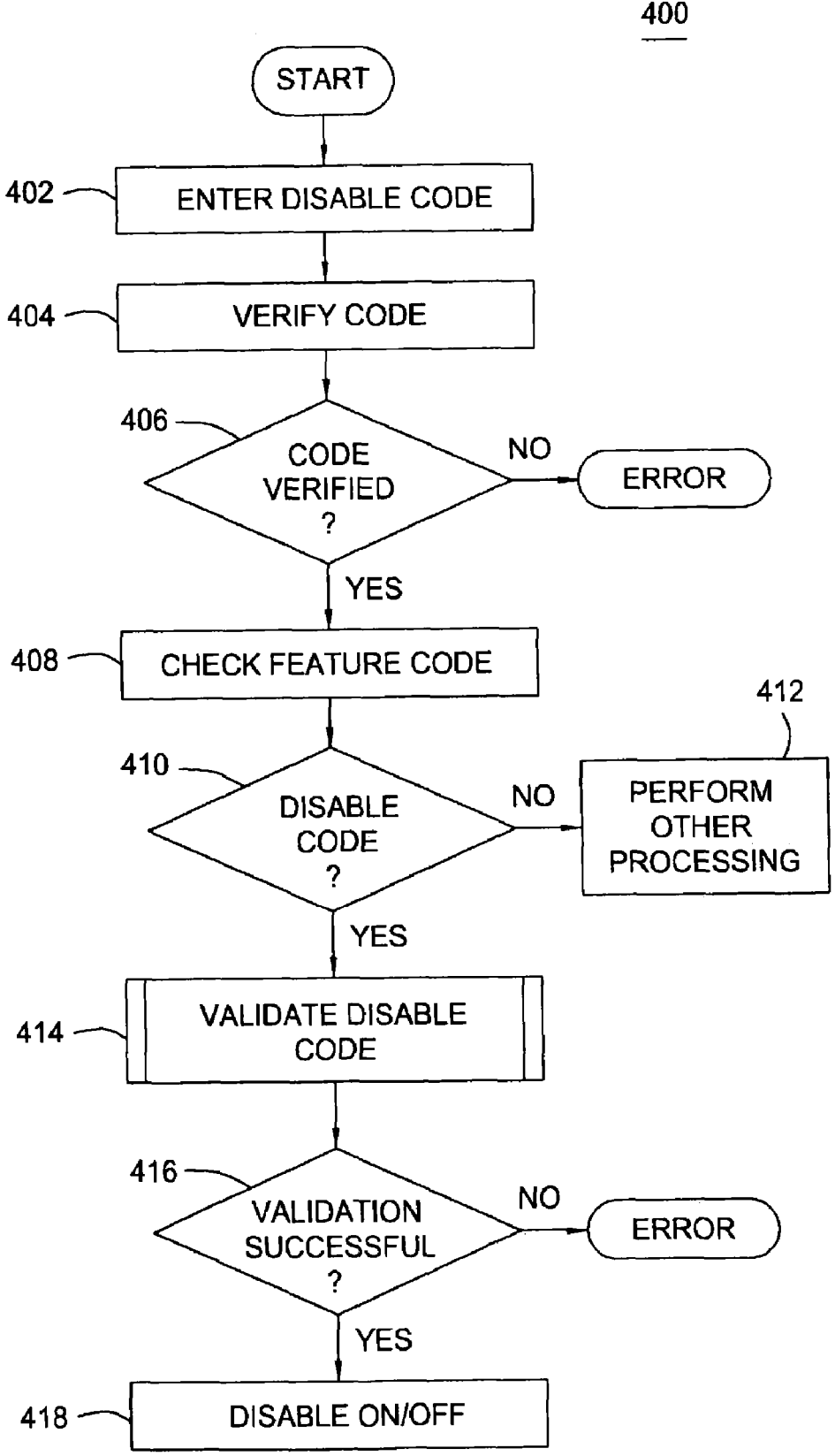
FIG. 4 is a flowchart illustrating one embodiment of inputting and validating a disablement code.

Referring now to FIG. 4, a flowchart is shown illustrating one embodiment of a method 400 for validating a disablement code on the customer computer 104. In the illustrative embodiment, the method 400 is performed by the code validation algorithm 124. In one embodiment, the disablement code is entered into the customer computer 104 (step 402), via the user interface 118. If a checksum was calculated over the disablement code, the checksum is calculated by the customer computer 104 then is used to verify that the disablement code has not been corrupted by keying or transmission errors (step 404). If the code has been corrupted (step 406), an error message is returned to the user. Otherwise, the code validation algorithm 124 checks the feature code of the entered disablement code (step 408). The feature code enables the validation algorithm 124 to determine whether the code entered by the user is a disablement code or some other code (e.g., an enablement code). If the entered code is determined not to be a disablement code (step 410), the code validation algorithm 124 performs the necessary processing, which may include calling another routine (step 412). If the entered code is determined to be a disablement code, the code validation algorithm 124 performs a validation sequence (step 414). One embodiment of the validation sequence performed at step 414 will be described below with respect FIG. 5. If the validation is successful (step 416) the On/Off Capacity feature is disabled (step 418); otherwise, an error message is returned to the user.

Figure 5:
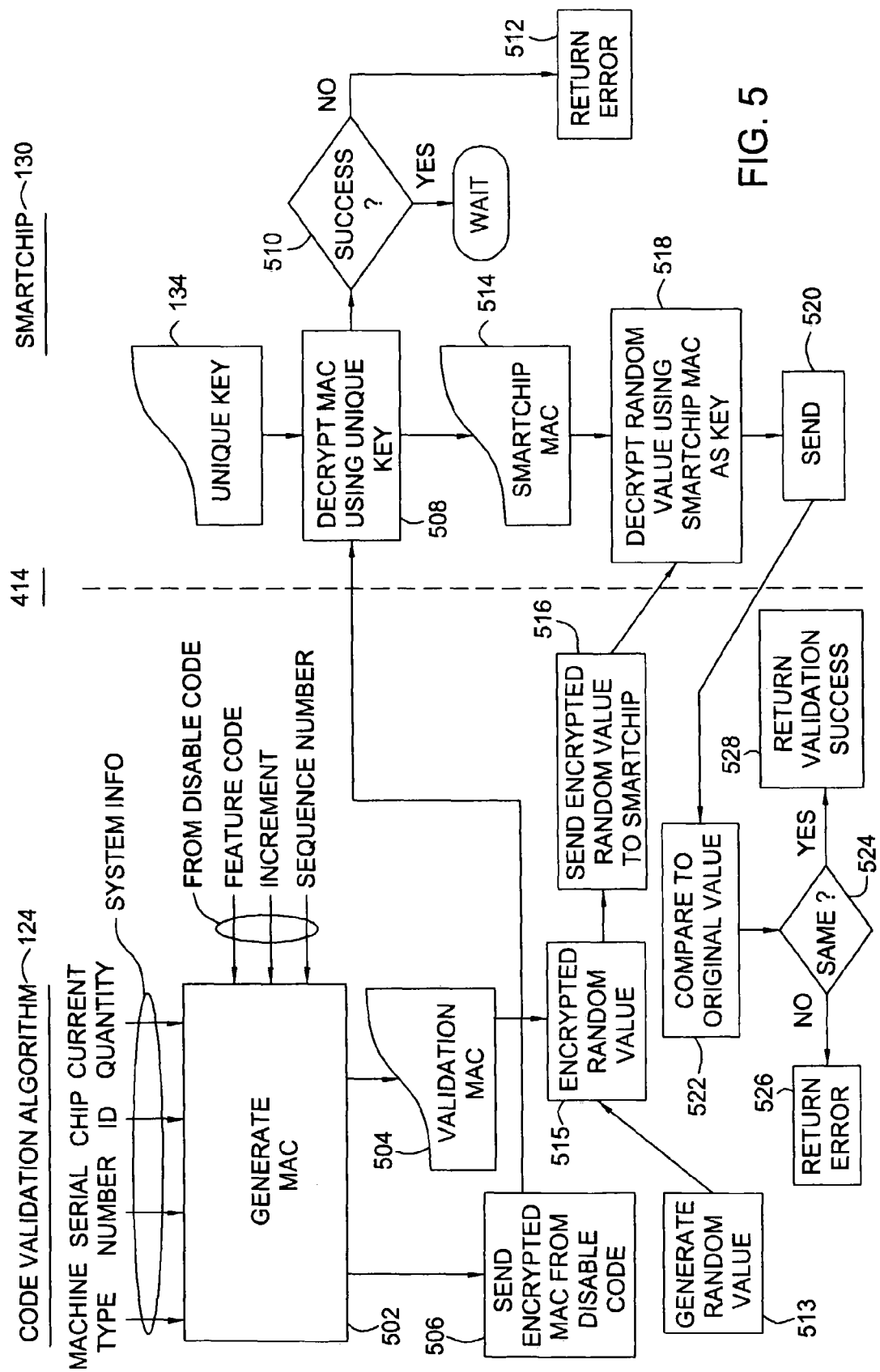
FIG. 5 is a flow chart illustrating one embodiment of validating a disablement code.

Referring now to FIG. 5, one embodiment of the validation sequence performed at step 414 will be described. Generally, the validation sequence 414 is an exchange between the code validation algorithm 124 and a smart chip on the customer computer, e.g., the smart chip 130 shown in FIG. 1. Initially (at step 502), the code validation algorithm 124 may generate a MAC (referred to herein as the validation MAC 504) using the same algorithm as that used by the MAC generation algorithm 125 of the disablement code generator 113 on the provider computer 102. The same input fields are also used, although they are received from different sources. In particular, the system information (e.g., machine type, serial number) may be received from storage of the customer computer 104 and the chip ID for the smart chip 130 may be retrieved from the smart chip 130 itself. Illustratively, the current quantity value is also input, but may conveniently be forced to zero (0). Other inputs (which, again, may not be necessary depending upon embodiment) including the feature code 302, increment 304, and sequence number 306 are received from the disablement code input by the user at step 402 of the method 400 (see FIG. 3 and FIG. 4).

The code validation algorithm 124 then sends to the smart chip 130 the encrypted MAC 204 that was included with the disablement code (step 506). Upon receipt, the smart chip 130 decrypts the MAC 204 using its unique key 134 (step 508), which is presumably the same key as was used to encrypt the MAC 204. This decryption yields a decrypted MAC, referred to herein as the smart chip MAC 514. If the keys are not the same, the decryption will be unsuccessful (step 510). An unsuccessful decryption may result in the sequence 414 returning an error (step 512) if parity checking is implemented and the parity is wrong. Alternatively, the validation software determines that the decryption was not successful by comparing or using the keys (i.e., the MAC 204 and the smart chip MAC 514) and determining that they are different. Persons skilled in the art will recognize other embodiments. In any case, if the keys are the same, the decryption is successful and yields the smart chip MAC 514, which will be the same as the MAC 202 generated by the MAC generator algorithm 125 in FIG. 2.

To verify that both are using the same MAC, the code validation algorithm 124 and the smart chip 130 exchange encrypted data, each using its own copy of the MAC as encryption key. It is noted that any variety of exchanges is contemplated and the following is merely illustrative. In one embodiment, the exchange is initiated by the code validation algorithm 124, which generates a random value (step 513), encrypts the value using the validation MAC 504 as a key (step 515), and then sends the encrypted value to the smart chip 130 (step 516). Upon receipt, the smart chip 130 decrypts the random value using the smart chip MAC 514 as decryption key (step 518). The smart chip 130 then sends the decrypted random value to the code validation program 124 (step 520). Upon receipt, the code validation algorithm 124 compares the received decrypted random value to the original random value (step 522). If the values are the same (step 524), it is confirmed that the disablement code 115 has been input to the appropriate system, with respect to which the disablement code 115 is unique. If the values are the same, an indication of the success may be returned by the sequence 414 (step 528), and the code validation algorithm 124 disables the On/Off Capacity feature (steps 416 and 418 of FIG. 4); otherwise, an error may be returned (step 526).

Accordingly, embodiments for disabling a capacity on-demand feature are provided. Unlike inferior disablement approaches, the present invention does not require powering down and subsequently powering up a system. Further, the disablement codes provide a convenient, non-intrusive means of disabling the on-demand feature since the disablement codes may be disseminated to customers via any variety of communication means. In addition, at least one embodiment of the disablement codes is completely compatible with existing enablement code technologies.

However, although embodiments of the invention may achieve advantages over other possible solutions, whether or not a particular advantage is achieved by a given embodiment is not limiting of the invention.

While the foregoing is directed to embodiments of the present invention, other and further embodiments of the invention may be devised without departing from the basic scope thereof, and the scope thereof is determined by the claims that follow.

What is claimed is:

1. A computer-implemented method for disabling on-demand resources on a computerized apparatus, comprising:

receiving a disablement code comprising encrypted data;
validating the disablement code, the validating comprising:
- generating a first key using system information unique to the computerized apparatus;
- decrypting the encrypted data using a second key to produce decrypted data;
- encrypting a value to produce an encrypted value wherein the encrypting is done using an encryption key selected from one of (i) the decrypted data and (ii) the first key;
- decrypting the encrypted value to produce a decrypted value wherein the decrypting is done using (i) the first key if the value was encrypted using the decrypted data as the encryption key and (ii) the decrypted data if the value was encrypted using the first key as the encryption key; and
- comparing the value to the decrypted value; and disabling at least one on-demand resource if the validating is successful, thereby rendering the disabled on-demand resource unavailable for use by users of the computerized apparatus, wherein the disabled on-demand resource is a hardware resource of the computerized apparatus.

2. The computer-implemented method of claim 1 wherein the validating is successful if the value and the decrypted value are the same.

3. The computer-implemented method of claim 1 wherein the decrypted data is identical to the first key.

4. The computer-implemented method of claim 1 wherein decrypting the encrypted data is performed by a smart chip containing the second key.

5. The computer-implemented method of claim 1 wherein the at least one on-demand resource was previously enabled to allow a user to request usage of the at least one on-demand resource.

6. The computer-implemented method of claim 1 wherein, prior to the disabling, the at least one on-demand resource is enabled to allow a user to request usage of the at least one on-demand resource and wherein disabling comprises preventing the user from requesting usage of the at least one on-demand resource.

7. The computer-implemented method of claim 1 wherein the at least one on-demand resource is a processor.

8. The computer-implemented method of claim 1 wherein the at least one on-demand resource comprises one of memory and storage.

9. The computer-implemented method of claim 1 wherein the disablement code is input by a user.

10. A computer-implemented method for controlling availability of on-demand resources on a computerized apparatus, comprising:
- receiving an enablement code for an on-demand resource;
- validating the enablement code;
- upon validating the enablement code, enabling the on-demand resource, whereby usage of the on-demand resource may be requested by a user;
- receiving a disablement code for an on-demand resource comprising encrypted data;
- validating the disablement code wherein the validating comprises:
  - generating a first key using system information unique to the computerized apparatus,
  - decrypting the encrypted data using a second key to produce decrypted data,
  - encrypting a value, using the first key as an encryption key, to produce an encrypted value,
  - decrypting the encrypted value, using the decrypted data as a decryption key, to produce a decrypted value, and
  - comparing the value to the decrypted value; and
- disabling the on-demand resource, wherein the disabled on-demand resource is a hardware resource of the computerized apparatus; whereby usage of the on-demand resource may no longer be requested by the user.

11. The computer-implemented method of claim 10 wherein validating the enablement code and validating the disablement code are performed by the same algorithm.

12. The computer-implemented method of claim 10 wherein enabling comprises unlocking the on-demand resource.

13. The computer-implemented method of claim 10 wherein the on-demand resource is computer hardware.

14. The computer-implemented method of claim 10 wherein the on-demand resource is selected from one of processors, memory and storage.

15. The computer-implemented method of claim 10 wherein validating the disablement code comprises verifying that the disablement code is unique to the on-demand resource.

16. The computer-implemented method of claim 10 wherein the decrypting is performed by a smart chip containing the second key.

17. The computer-implemented method of claim 10 wherein the encrypted data was encrypted using a copy of the second key at a remote location.

* * * * *